(12) United States Patent
Cheng

(10) Patent No.: US 11,550,358 B2
(45) Date of Patent: Jan. 10, 2023

(54) ROTATING DEVICE, HOUSING, AND ELECTRONIC DEVICE

(71) Applicant: GUANGDONG OPPO MOBILE TELECOMMUNICATIONS CORP., LTD., Dongguan (CN)

(72) Inventor: Jiao Cheng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/357,059

(22) Filed: Jun. 24, 2021

(65) Prior Publication Data

US 2021/0318723 A1 Oct. 14, 2021

Related U.S. Application Data

(63) Continuation of application No. PCT/CN2020/075717, filed on Feb. 18, 2020.

(30) Foreign Application Priority Data

Feb. 25, 2019 (CN) .......................... 201910139449.9

(51) Int. Cl.
*G06F 1/16* (2006.01)
(52) U.S. Cl.
CPC .......... *G06F 1/1618* (2013.01); *G06F 1/1652* (2013.01); *G06F 1/1681* (2013.01)
(58) Field of Classification Search
CPC ..... G06F 1/1618; G06F 1/1652; G06F 1/1681
See application file for complete search history.

(56) References Cited

U.S. PATENT DOCUMENTS 10,028,395 B2 * 7/2018 Chen ..................... G06F 1/1626
10,054,981 B2 8/2018 Nakamura et al.
(Continued)

FOREIGN PATENT DOCUMENTS

CN 105979032 A 9/2016
CN 205750631 U 11/2016
(Continued)

OTHER PUBLICATIONS

International Search Report and Written Opinion dated May 20, 2020 in International Application No. PCT/CN2020/075717. English translation attached.
(Continued)

*Primary Examiner* — Michael A Faragalla
*Assistant Examiner* — Sujit Shah
(74) *Attorney, Agent, or Firm* — Sheppard, Mullin, Richter & Hampton LLP

(57) ABSTRACT

Provided is a rotating device, a housing, and an electronic device including the housing and a flexible screen. The housing includes a first frame body, a second frame body, and the rotating device. The rotating device is connected between the first frame body and the second frame body to fold or unfold the first and second frame bodies. The rotating device includes at least one pair of rotation assemblies, and a gear assembly between the rotation assemblies. Each rotation assembly includes a support frame and a rotating rack rotatably connected to the support frame. The rotating rack is provided with a driving gear engaging with the gear assembly. The rotating racks of one pair of rotation assemblies are synchronously rotatable by rotating the rotating rack relative to a corresponding support frame to rotate a corresponding driving gear, and further rotating the gear assembly by the corresponding driving gear.

18 Claims, 13 Drawing Sheets

(56) References Cited

U.S. PATENT DOCUMENTS

| | | | |
|---|---|---|---|
| 2013/0139355 A1 | 6/2013 | Lee et al. | |
| 2014/0001941 A1* | 1/2014 | Liang | G06F 1/1681 |
| | | | 16/275 |
| 2018/0102496 A1* | 4/2018 | Kim | H04M 1/0268 |
| 2019/0166703 A1* | 5/2019 | Kim | G06F 1/1652 |
| 2019/0196541 A1* | 6/2019 | O'Neil | H04M 1/0216 |

FOREIGN PATENT DOCUMENTS

| | | |
|---|---|---|
| CN | 106415432 A | 2/2017 |
| CN | 206195847 U | 5/2017 |
| CN | 107508932 A | 12/2017 |
| CN | 207018340 U | 2/2018 |
| CN | 108055371 A | 5/2018 |
| CN | 108173995 A | 6/2018 |
| CN | 108200248 A | 6/2018 |
| CN | 108322567 A | 7/2018 |
| CN | 207777905 U | 8/2018 |
| CN | 108665812 A | 10/2018 |
| CN | 207977988 U | 10/2018 |
| CN | 208106963 U | 11/2018 |
| CN | 208225377 U | 12/2018 |
| CN | 109270987 A | 1/2019 |
| CN | 108322567 B | 11/2019 |
| CN | 209731301 U | 12/2019 |
| CN | 112995368 B | 12/2021 |
| CN | 111613131 B | 3/2022 |
| KR | 10-2018-0010019 A | 1/2018 |
| KR | 101843759 B1 | 4/2018 |
| KR | 20180094172 A | 8/2018 |
| WO | 2018070764 A1 | 4/2018 |

OTHER PUBLICATIONS

First Office Action from corresponding Chinese Application No. 201910139449.9, dated Jul. 15, 2021. English translation attached.

Extended European Search Report dated Dec. 22, 2021 received in European Patent Application No. EP 20763640.8.

Intent to Grant from corresponding Chinese Application No. 201910139449.9, dated Jan. 11, 2022. English translation attached. 3 pages.

* cited by examiner

ROTATING DEVICE, HOUSING, AND ELECTRONIC DEVICE

CROSS-REFERENCE TO RELATED APPLICATIONS

This application is a continuation of International Application No. PCT/CN2020/075717, filed on Feb. 18, 2020, which claims priority to Chinese Patent Application No. 201910139449.9, filed on Feb. 25, 2019. The disclosures of the aforementioned applications are hereby incorporated by reference in their entireties.

TECHNICAL FIELD

The present disclosure relates to the field of folding of foldable screens, and more particularly, to a rotating device capable of folding a flexible screen, a housing provided with the rotating device, and an electronic device provided with the housing.

BACKGROUND

Flexible display screens are widely favored by consumers due to their advantages such as bendability, curved surfaces, flexibility, and stretchability. Generally, existing flexible display screens are supported on a housing of an electronic device through hinges, such that the flexible display screens can be supported and folded.

BRIEF DESCRIPTION OF DRAWINGS

In order to clearly explain technical solutions of embodiments of the present disclosure, drawings used in embodiments are briefly described below. The drawings as described below are merely some embodiments of the present disclosure. Based on these drawings, other obvious variants can be obtained by those skilled in the art without creative effort.

DESCRIPTION OF EMBODIMENTS

Figure 1:
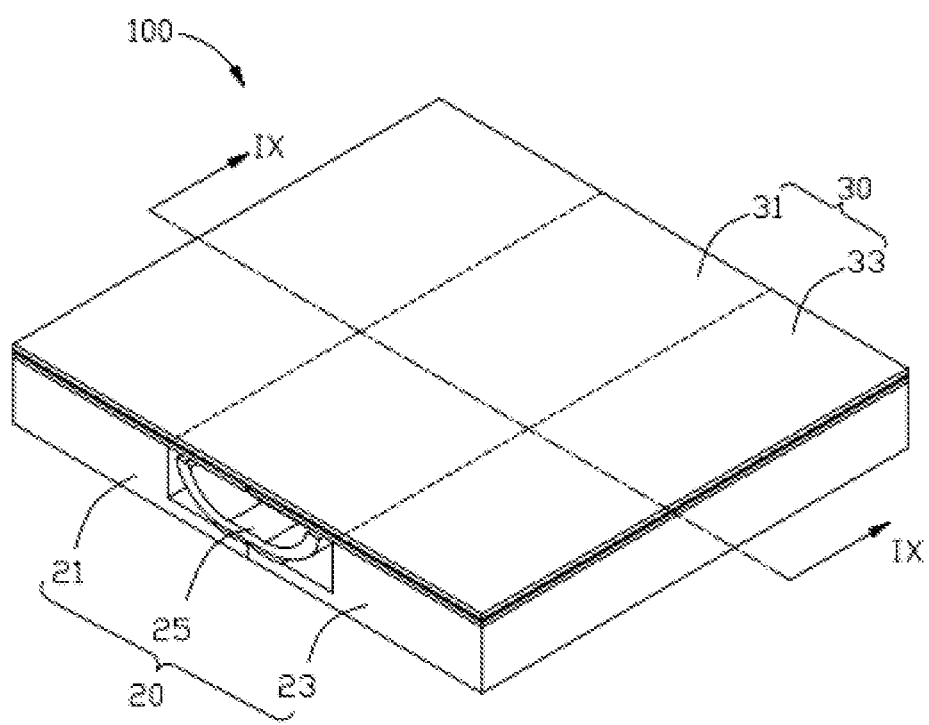
FIG. 1 is a schematic perspective view of an electronic device according to an embodiment of the present disclosure.

A rotating device is provided. The rotating device can include at least one pair of rotation assemblies, and a gear assembly located between the rotation assemblies of one pair of at least one pair of rotation assemblies. Each rotation assembly of the at least one pair of rotation assemblies can include a support frame and a rotating rack rotatably connected to the support frame. The rotating rack can be provided with a driving gear engaging with the gear assembly. The rotating racks of one pair of rotation assemblies can be synchronously rotatable by rotating the rotating rack relative to a corresponding support frame; driving, by the rotation of the rotating rack, a corresponding driving gear to rotate; and further rotating, by the rotation of the corresponding driving gear, the gear assembly.

In each rotation assembly of the at least one pair of rotation assemblies, a rotation shaft between the support frame and the rotating rack can be a virtual shaft, and an axis of the virtual shaft can be located outside the rotation assembly.

In each rotation assembly of the at least one pair of rotation assemblies, the support frame and the rotating rack can be connected to each other through a first arc-shaped groove and a first rotating rib that can mutually match with each other, and an axis of the first arc-shaped groove can coincide with the axis of the virtual shaft of the rotation assembly.

The first arc-shaped groove can be defined in the support frame, and the first rotating rib can be provided on the rotating rack; or the first arc-shaped groove can be defined in the rotating rack, and the first rotating rib can be provided on the support frame. The first rotating rib can be slidably accommodated in the first arc-shaped groove.

An accommodating space can be defined in the support frame. The rotating rack can include a rotating block protruding from the rotating rack and rotatably accommodated in the accommodating space. The rotating block and the support frame can be slidably connected to each other through the first arc-shaped groove and the first rotating rib.

The first arc-shaped groove can be defined in the rotating block. The first rotating rib can be provided on the support frame by protruding from an inner wall of the accommodating space; or the first arc-shaped groove can be defined in the inner wall of the accommodating space of the support frame, and the first rotating rib can be provided on the rotating block by protruding therefrom.

The rotating rack can include a rotating piece and a connecting piece. The rotating block can be arranged at one end of the rotating piece. The driving gear can be arranged at one end of the connecting piece. An end of the connecting piece facing away from the driving gear can be fixed to the one end of the rotating piece where the rotating block is arranged.

The connecting piece can be fixed to the rotating piece through a screw connection, a snap connection, or an adhesive connection.

The connecting piece and the rotating piece can be formed as one piece.

A guide groove can be defined in the support frame. The connecting piece can be provided with a guide plate protruding from the connecting piece and rotatably accommodated in the accommodating groove. The guide plate and the support frame can be slidably connected to each other through a second arc-shaped groove and a second rotating rib. A rotation axis of the second arc-shaped groove can coincide with the rotation axis of the virtual shaft of a corresponding rotation assembly.

The second arc-shaped groove can be defined in the guide plate, and the second rotating rib can protrude from a side surface of the guide groove of the support frame; or the second arc-shaped groove can be defined in the side surface of the guide groove of the support frame, and the second rotating rib can protrude from the guide plate.

The gear assembly can include one pair of first transmission gears engaging with the driving gears of the rotating racks of one pair of rotation assemblies, and one pair of second transmission gears located between the one pair of first transmission gears. Second transmission gears of the one pair of second transmission gears can engage with each other, and can engage with first transmission gears of the one pair of first transmission gears, respectively.

Each first transmission gear of the one pair of first transmission gears can be sleeved on a first rotation shaft. Each second transmission gear of the one pair of second transmission gears can be sleeved on a second rotation shaft. The first rotation shaft can be parallel to the second rotation shaft. The first rotation shaft and the second rotation shaft can be respectively connected between the at least one pair of rotation assemblies.

The rotating device can further include a housing. The support frames of the at least one pair of rotation assemblies can be fixed in the housing.

A housing is provided. The housing can include a first frame body, a second frame body, and a rotating device. The rotating device can include at least one pair of rotation assemblies and a gear assembly located between rotation assemblies of one pair of the at least one pair of rotation assemblies. Each rotation assembly of the at least one pair of rotation assemblies can include a support frame and a rotating rack rotatably connected to the support frame. The rotating rack can be provided with a driving gear engaging with the gear assembly. The rotating racks of one pair of rotation assemblies can be synchronously rotatable by rotating the rotating rack relative to a corresponding support frame; driving, by the rotation of the rotating rack, a corresponding driving gear to rotate; and further rotating, by the rotation of the corresponding driving gear, the gear assembly. The rotating device can be connected between the first frame body and the second frame body. The rotating device can be configured to fold or unfold the first frame body and the second frame body.

A first accommodating groove can be defined on a side adjacent to the second frame body of the first frame body. A second accommodating groove can be defined on a side adjacent to the first frame body of the second frame body. The rotating device can be accommodated in a space defined by the first accommodating groove and the second accommodating groove.

A first mounting groove can be defined in the first frame body. A second mounting groove can be defined in the second frame body. The rotating racks of the one pair of rotation assemblies of the rotating device can be connected into the first mounting groove of the first frame body and the second mounting groove of the second frame body, respectively.

An electronic device is provided. The electronic device can include a flexible screen and a housing. The flexible screen can be arranged on the housing. The housing can include a first frame body, a second frame body, and a rotating device. The rotating device can include at least one pair of rotation assemblies, and a gear assembly located between rotation assemblies of one pair of the at least one pair of rotation assemblies. Each rotation assembly of the at least one pair of rotation assemblies can include a support frame and a rotating rack rotatably connected to the support frame. The rotating rack can be provided with a driving gear engaging with the gear assembly. The rotating racks of one pair of rotation assemblies can be synchronously rotatable by rotating the rotating rack relative to a corresponding support frame; driving, by the rotation of the rotating rack, a corresponding driving gear to rotate; and further rotating, by the rotation of the corresponding driving gear, the gear assembly. The rotating device can be connected between the first frame body and the second frame body. The rotating device can be configured to fold or unfold the first frame body and the second frame body.

An axis of a virtual shaft of each rotation assembly of the at least one pair of rotation assemblies of the rotating device can be located on a neutral layer of the flexible screen.

A first flat plate can be arranged between the first frame body and the flexible screen, and a second flat plate can be arranged between the second frame body and the flexible screen. A support sheet can be attached to a side surface of the flexible screen facing towards the housing. The support sheet can be attached to the first flat plate and the second flat plate.

The technical solutions according to the embodiments of the present disclosure will be clearly and completely described below in combination with the accompanying drawings of the embodiments of the present disclosure. The embodiments described below are only a part of the embodiments of the present disclosure, rather than all of the embodiments. On basis of the embodiments in the present disclosure, all other embodiments obtained by a person skilled in the art without creative labor shall fall within the protection scope of the present disclosure.

Figure 2:
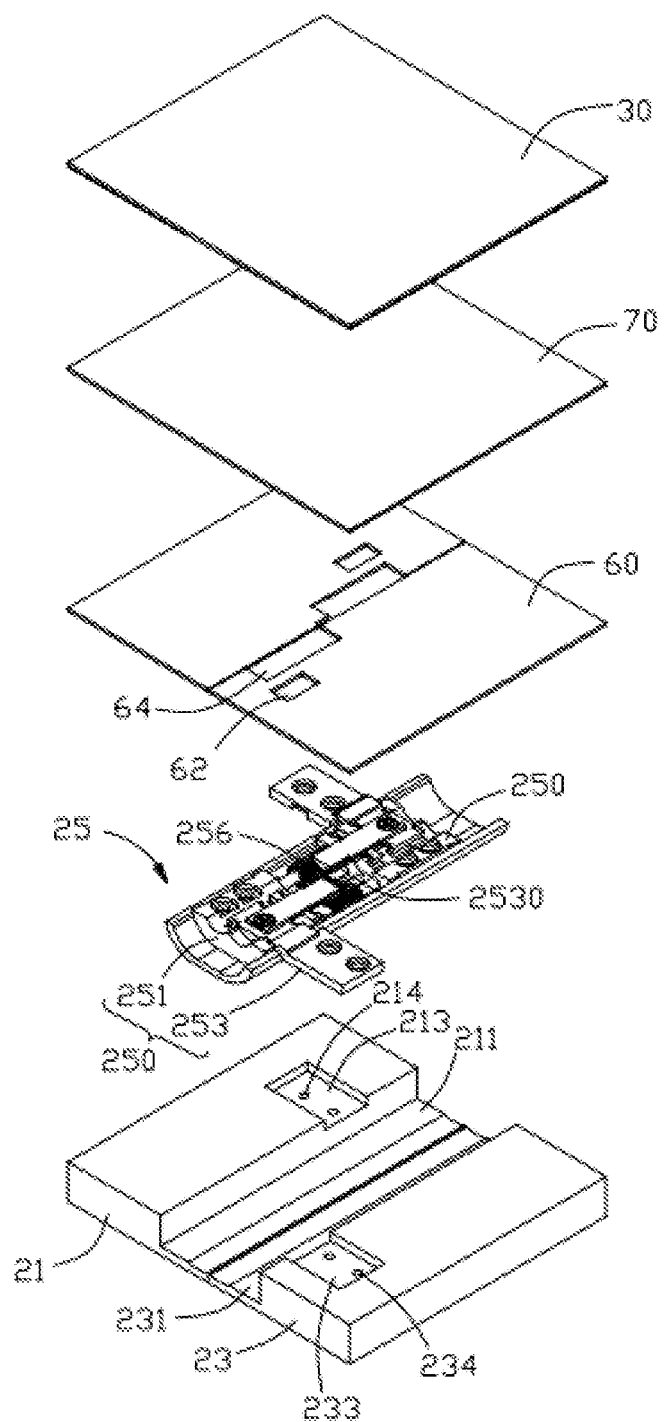
FIG. 2 is an exploded perspective view of an electronic device in FIG. 1.
Figure 3:
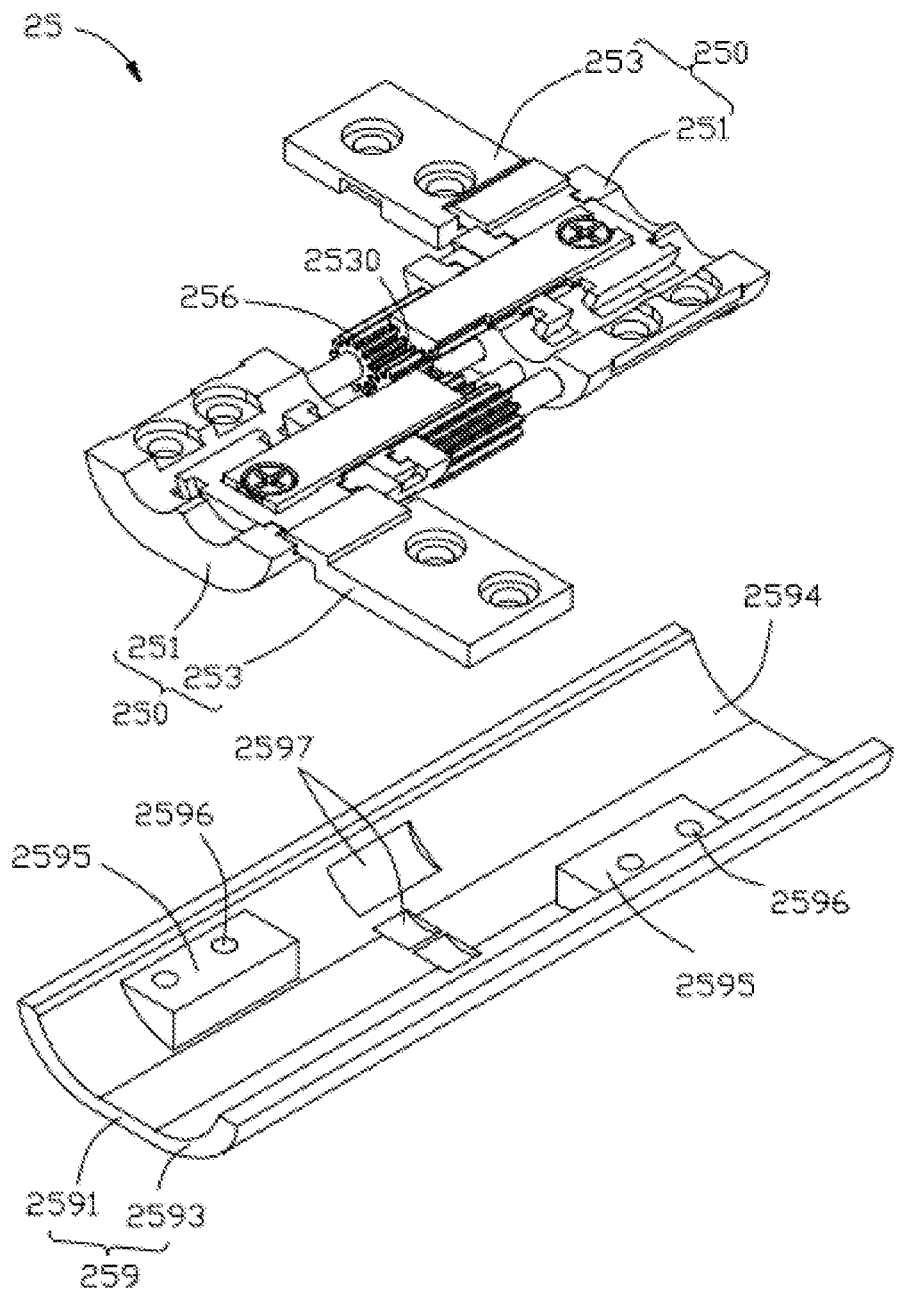
FIG. 3 is an exploded view of a rotating device and a shell in FIG. 2.

FIG. 1 is a schematic perspective view of an electronic device according to an embodiment of the present disclosure. FIG. 2 is an exploded perspective view of an electronic device in FIG. 1. FIG. 3 is an exploded view of a rotating device and a shell in FIG. 2. Referring to FIG. 1 to FIG. 3, an electronic device 100 according to an embodiment of the present disclosure includes a housing 20 and a flexible screen 30 disposed on the housing 20. The housing 20 includes a first frame body 21, a second frame body 23, and a rotating device 25 connected between the first frame body 21 and the second frame body 23. The flexible screen 30 is disposed on the first frame body 21, the second frame body 23, and the rotating device 25. The flexible screen 30 has a foldable region 31 corresponding to the rotating device 25, and two non-foldable regions 33 connected to two opposite sides of the foldable region 31. The rotating device 25 is supported on a rear surface of the foldable region 31 of the flexible screen 30. The rotating device 25 is configured to fold or unfold the first frame body 21 and the second frame body 23. The rotating device 25 includes at least one pair of rotation assemblies 250, a gear assembly 256 located between the at least one pair of rotation assemblies 250, and a shell 259. The rotation assembly 250 is fixed in the shell 259. Each rotation assembly 250 includes a support frame 251, and a rotating rack 253 rotatably connected to the support frame 251. The rotating rack 253 is provided with a driving gear 2570 engaging with the gear assembly 256. The rotating racks 253 of the at least one pair of rotation assemblies 250 are fixed to the first frame body 21 and the second frame body 23, respectively. The rotating rack 253 is rotatable relative to a corresponding support frame 251 to drive a corresponding driving gear 2570 to rotate, and the corresponding driving gear 2570 drives the gear assembly 256 to rotate, so as to allow two rotating racks 253 to rotate synchronically. In this way, the first frame body 21 and the second frame body 23 can synchronously rotate towards each other or away from each other. That is, the first frame body 21 and the second frame body 23 are folded or unfolded through a linkage mechanism.

In an embodiment, the electronic device 100 is a mobile phone. It can be understood that, in other embodiments, the electronic device 100 may be, but not limited to, a radio phone, a pager, a Web browser, a notebook, a calendar, and/or a Personal Digital Assistant (PDA) of a Global Positioning System (GPS) receiver.

In the present disclosure, the rotating device 25 of the electronic device 100 includes one pair of rotation assemblies 250 and one gear assembly 256 located between the one pair of rotation assemblies 250. A rotating rack 253 of each rotation assembly 250 is rotatably connected to a support frame 251. For one pair of rotating racks 250, ends of the rotating racks 253 facing away from the corresponding support frames 251 are connected to the first frame body 21 and the second frame body 23, respectively. A driving gear 2570 on each rotating rack 253 engages with the gear assembly 256. One of the rotating racks 253 is rotated relative to the support frame 251 to drive a driving gear 2570 to rotate, and the driving gear 2570 drives the gear assembly 256 to rotate, so as to allow the one pair of rotating racks 253 to rotate synchronically, thereby folding or unfolding the first frame body 21 and the second frame body 23. The rotating device 25 can realize a synchronous linkage rotation, which facilitates the folding or unfolding of the electronic device 100 and is convenient to use. In addition, the rotating device 25 has a simple structure, which can be assembled and disassembled conveniently, thereby saving the time for assembly and disassembly and reducing the production costs.

A rotation shaft between the support frame 251 and the rotating rack 253 of each rotation assembly 250 of the rotating device 25 is a virtual shaft. An axis of the virtual shaft is located outside the rotation assembly 250. In an embodiment, the axes of the rotation shafts of the paired rotation assemblies 250 of the rotating device 25 are both located on a neutral layer of the flexible screen 30, so as to improve a folding resistance of the flexible screen 30 and prevent the flexible screen 30 from being damaged to the greatest extent.

In the present disclosure, during a folding process of the flexible screen 30, an outer layer of the flexible screen 30 is stretched, and an inner layer of the flexible screen 30 is squeezed. In a cross section of the flexible screen 30, the neutral layer is a transition layer of the flexible screen 30 that is neither stretched nor squeezed and subjected to an insignificant stress. The axis of the rotation shaft of the rotation device 25 according to the present disclosure is located on the neutral layer when the electronic device 100 is folded or unfolded, thereby preventing the flexible screen 30 from being damaged to the greatest extent.

As illustrated in FIG. 2, a first accommodating groove 211 is defined on a side of the first frame body 21 close to the second frame body 23, and a second accommodating groove 231 is defined on a side of the second frame body 23 close to the first frame body 21. When the first frame body 21 and the second frame body 23 are in an unfolded state, the rotating device 25 is accommodated in a space defined by the first accommodating groove 211 and the second accommodating groove 231. A first mounting groove 213 is defined on a front surface of the first frame body 21 adjacent to the first accommodating groove 211. The first mounting groove 213 is configured to mount one rotating rack 253. A plurality of locking holes 214 is defined on a bottom surface of the first mounting groove 213. A second mounting groove 233 is defined on a front surface of the second frame body 23 adjacent to the second accommodating groove 231. The second mounting groove 233 is configured to mount another rotating rack 253. In an embodiment, a plurality of locking holes 234 is defined on a bottom surface of the second mounting groove 233.

In the present disclosure, the front surface refers to a surface facing towards a light-emitting surface of the flexible screen 30, and the rear surface refers to a surface facing away from the light-emitting surface of the flexible screen 30.

As illustrated in FIG. 3, the shell 259 includes a rectangular base plate 2591 and two arc-shaped side plates 2593 located on two opposite side edges of the base plate 2591. The base plate 2591 and the two side plates 2593 jointly define a mounting space 2594. The rotation assemblies 250 and the gear assembly 256 are accommodated in the mounting space 2594. A connecting block 2595 is provided on each end of two opposite ends of inner surfaces of the two side plates 2593 by protruding towards the mounting space 2594. A connecting hole 2596 is defined in the connecting block 2595. One or more avoidance grooves 2597 are provided on each inner surface of the shell 259 between the two connecting blocks 2595. The one or more avoidance grooves 2597 are configured to avoid the gear assembly 256.

Figure 4:
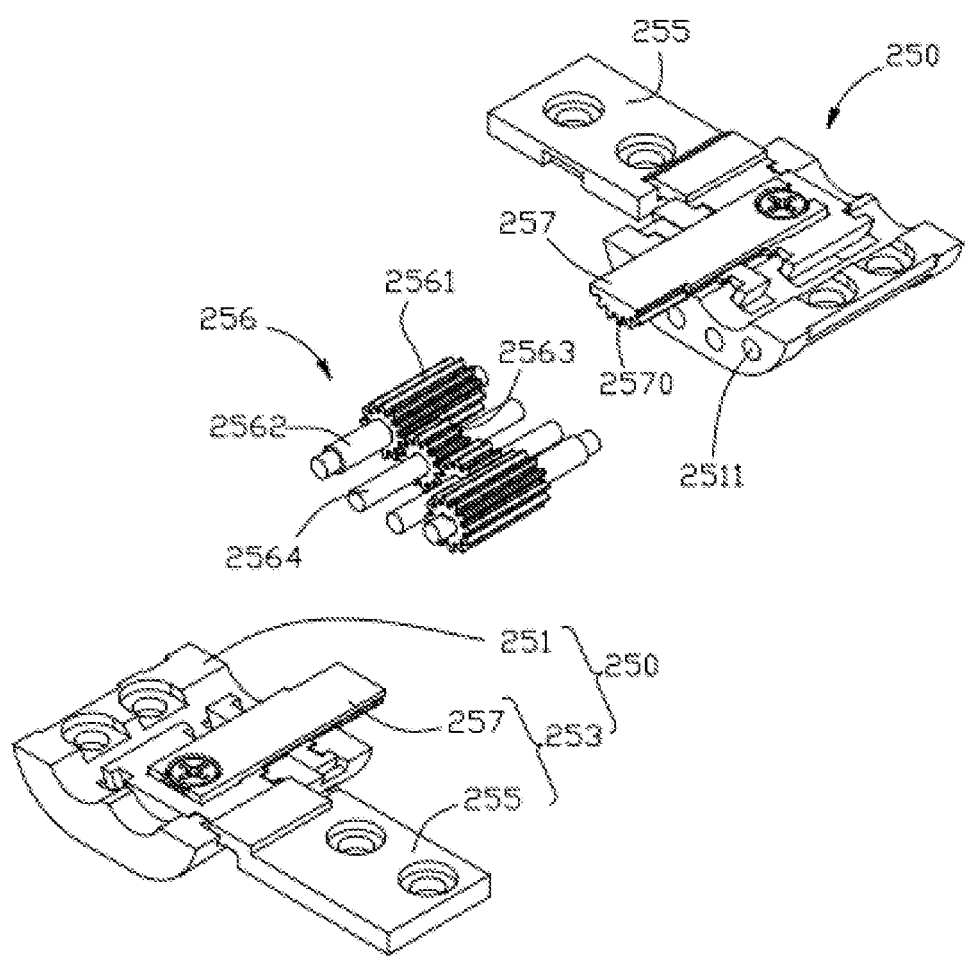
FIG. 4 is an exploded view of a rotating device in FIG. 3.
Figure 5:
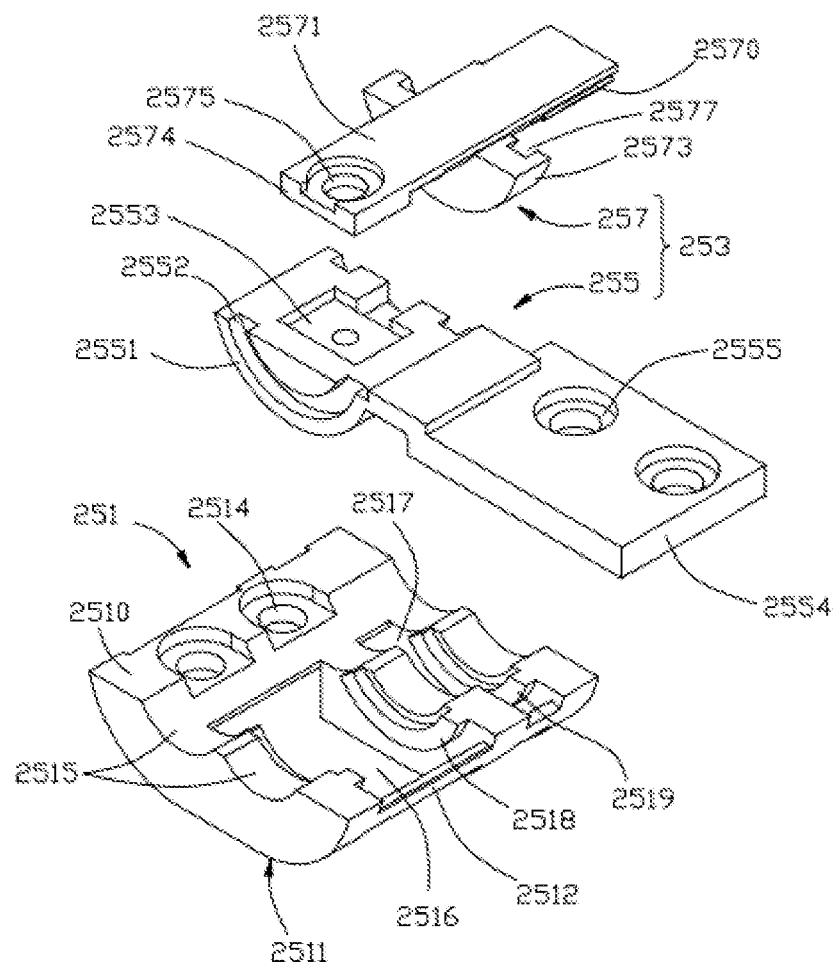
FIG. 5 is an exploded perspective view of one rotation assembly in FIG. 4.
Figure 6:
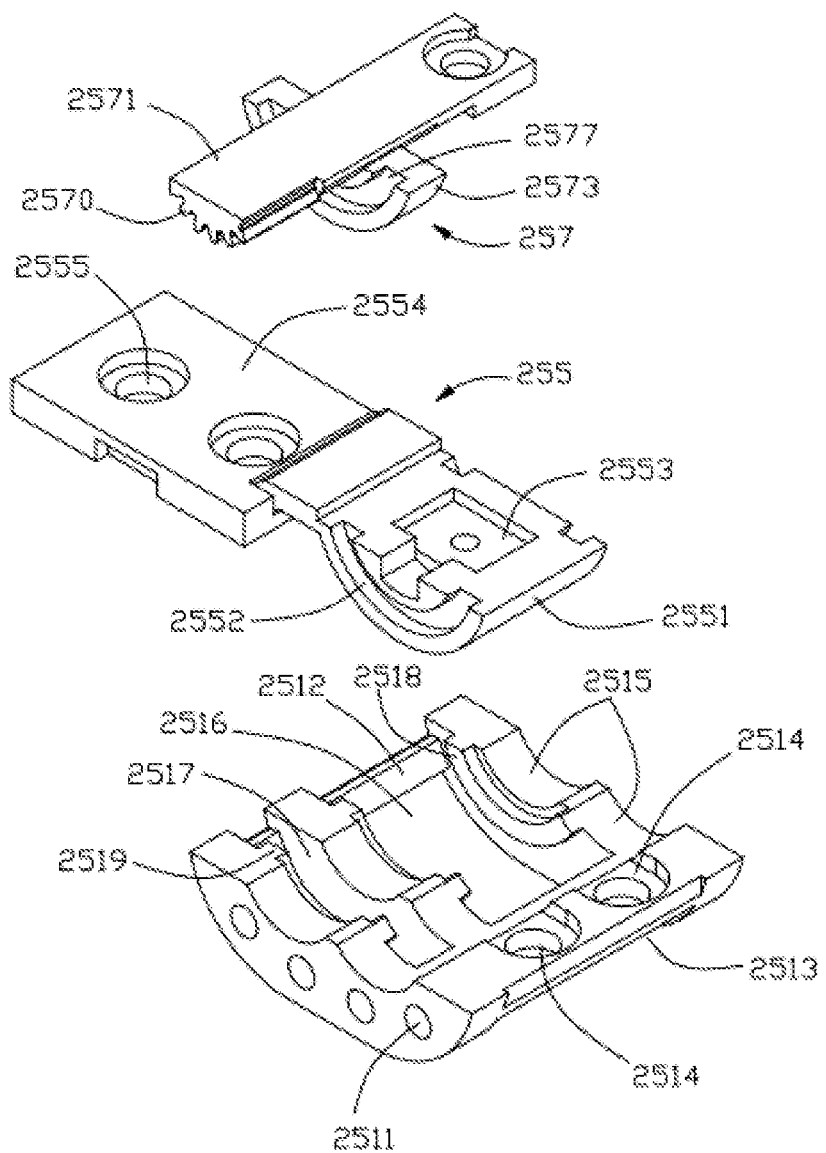
FIG. 6 is an exploded perspective view of the other rotation assembly in FIG. 4.

FIG. 4 is an exploded view of a rotating device in FIG. 3, where the rotating device includes one pair of rotation assemblies; FIG. 5 is an exploded perspective view of one rotation assembly in FIG. 4; and FIG. 6 is an exploded perspective view of the other rotation assembly in FIG. 4. Referring to FIG. 4 to FIG. 6, the support frame 251 includes a front surface 2510 and a rear surface. The front surface 2510 is a flat surface. The rear surface can be attached to an inner surface of the shell 259. A plurality of shaft holes 2511 is defined on an end surface of the support frame 251. The plurality of shaft holes 2511 is configured to connect the gear assembly 256. In an embodiment, four shaft holes 2511 spacing apart from each other are provided on an end surface of the support frame 251. A connection opening 2513 is defined on the rear surface in correspondence to the connecting block 2595 on the shell 259. The connecting block 2595 can be accommodated in the connection opening 2513. A through-hole 2514 corresponding to the connecting hole 2596 is defined on the front surface of the support frame 251. The through-hole 2514 is a countersunk hole for receiving a head of the locking member. Two accommodating grooves 2515 that are parallel to and spaced apart from each other are defined in a middle portion of the front surface 2510 of the support frame 251 and extend along an axial direction of the rotation shaft of the rotation assembly 250. A cross section of each accommodating groove 2515 has an arc shape. An accommodating space 2516 and a guide groove 2517 are respectively defined on two opposite ends of the front surface 2510 of the support frame 251 in such a manner that the accommodating space 2516 faces away from the shaft hole 2511, the guide groove 2517 is adjacent to the shaft hole 2511, and the accommodating space 2516 and the guide groove 2517 both penetrate through the accommodating groove 2515 and the rear surface. A positioning rod 2512 is provided in the accommodating space 2516 and on a side facing away from the through-hole 2514. Two opposite ends of the positioning rod 2512 are connected to two opposite inner walls of the accommodating space 2516, respectively. The positioning rod 2512 is spaced apart from the front surface 2510. One pair of arc-shaped first rotating ribs 2518 is provided on the support frame 251 by protruding from two opposite inner walls of the accommodating space 2516 towards the accommodating space 2516. An axis of each of the one pair of first rotating ribs 2518 coincides with an axis of the rotation shaft of the rotation assembly 250. A second rotating rib 2519 is provided on the support frame 251 by protruding from an inner wall of the guide groove 2517. An axis of the second rotating rib 2519 coincides with the axis of the rotation shaft of the rotation assembly 250.

The rotating rack 253 includes a rotating piece 255 and a connecting piece 257. The rotating piece 255 is substantially in a strip shape. A rotating block 2551 protrudes from one end of the rotating piece 255. A cross-section of the rotating block 2551 is in an arc shape, and the cross-section is taken along line IX-IX shown in FIG. 1. The rotating block 2551 can be rotatably accommodated in the accommodating space 2516 of the support frame 251. One pair of first arc-shaped grooves 2552 is defined on two opposite side surfaces of the rotating block 2551. The one pair of first arc-shaped grooves 2552 corresponds to the one pair of first rotating ribs 2518 in the accommodating space 2516 of the support frame 251. An axis of the first arc-shaped groove 2552 coincides with the axis of the rotation shaft of the rotation assembly 250. A connecting groove 2553 is defined on a front surface of the rotating piece 255 corresponding to the rotating block 2551. A connecting hole is defined on a bottom surface of the connecting groove 2553. An end of the rotating piece 255 facing away from the rotating block 2551 is provided with a mounting plate 2554. A plurality of mounting holes 2555 is defined on a front surface of the mounting plate 2554. The mounting hole 2555 is a through-hole with a countersunk head. A positioning groove is defined on the rear surface of the rotating piece 255 between the rotating block 2551 and the mounting plate 2554. A reinforcing plate is provided on the front surface of the rotating piece 255 at a position corresponding to the positioning groove. The reinforcing plate can reinforce the rotating piece 255.

The connecting piece 257 includes a strip-shaped connecting plate 2571, and a guide plate 2573 protruding from a rear surface of the connecting plate 2571. The driving gear 2570 is arranged on a rear surface of one end of the connecting plate 2571. In an embodiment, the driving gear 2570 has a cross section of a sector gear. That is, teeth of the driving gear 2570 are not distributed in a complete circumferential array in an axial direction. The teeth of the driving gear 2570 are arranged in an arcuate array on the rear surface of the connecting plate 2571 along an axial circumference. A connecting block 2574 protrudes from an end of the rear surface of the connecting plate 2571 facing away from the driving gear 2570. A countersunk hole 2575 is defined on a front surface of the connecting block 2574. The guide plate 2573 is located between the driving gear 2570 and the connecting block 2574. The guide plate 2573 is perpendicular to a length direction of the connecting plate 2571. The guide plate 2573 has a semicircular shape. The guide plate 2573 is rotatably accommodated in the guide groove 2517 of the support frame 251. A side surface of the guide plate 2573 is provided with a second arc-shaped groove 2577 corresponding to the second rotating rib 2519 in the guide groove 2517 of the support frame 251. An axis of the second arc-shaped groove 2577 coincides with the axis of the rotation shaft of the rotation assembly 250.

As illustrated in FIG. 4, the gear assembly 256 includes one pair of first transmission gears 2561 that are parallel to and spaced apart from each other, and one pair of second transmission gears 2563 located between the one pair of first transmission gears 2561. The paired first transmission gears 2561 are respectively engaged with the driving gears 2570 of the rotating racks 257 of the paired rotation assemblies 250. The paired second transmission gears 2563 engage with each other, and also engage with the paired first transmission gears 2561 in a one-to-one correspondence. Each first transmission gear 2561 is sleeved on one first rotation shaft 2562. Each second transmission gear 2563 is sleeved on one second rotation shaft 2564. The first rotation shaft 2562 is parallel to the second rotation shaft 2564. Two opposite ends of each of the first rotation shaft 2562 and the second rotation shaft 2564 are connected between the at least one pair of rotation assemblies 250. In an embodiment, the two opposite ends of each of the first rotation shaft 2562 and the second rotation shaft 2564 are rotatably connected in the corresponding shaft holes 2511. In the present disclosure, each of the first transmission gear 2561, the second transmission gear 2563, and the driving gear 2570 is a spur gear.

During the assembly of the rotating device 25, each rotation assembly 250 is assembled first. In an embodiment, the connecting block 2574 of the connecting piece 257 is placed in the connecting groove 2553 of the rotating piece 255. A locking member is provided to pass through the countersunk hole 2575 and to be locked in the connecting hole on the bottom surface of the connecting groove 2553, thereby fixing the connecting piece 257 on the rotating piece 255. A length direction of the connecting plate 2571 is perpendicular to a length direction of the rotating piece 255. Then, the rotating rack 253 is rotatably connected to the support frame 251, i.e., the rotating block 2551 and the guide plate 2573 of the rotating rack 253 are inserted into the accommodating space 2516 and the guide groove 2517 of the support frame 251, respectively. The driving gear 2570 on the connecting plate 2571 is accommodated in a corresponding accommodating groove 2515. The one pair of first rotating ribs 2518 is slidably accommodated in the one pair of first arc-shaped grooves 2552 of the rotating block 2551. The second rotating rib 2519 is also slidably accommodated in the second arc-shaped groove 2577 of the guide plate 2573. In this way, the rotating rack 253 is rotatably connected to the support frame 251. Then, the gear assembly 256 is mounted between the one pair of rotation assemblies 250. In an embodiment, the gear assembly 256 is placed between the one pair of rotation assemblies 250 in such a manner that the first rotation shafts 2562 on the one pair of first transmission gears 2561 directly face towards two shaft holes 2511 on an outer side of each rotation assembly 250, and two opposite ends of each first rotation shaft 2562 are inserted into the corresponding shaft holes 2511; and the second rotation shafts 2564 on the one pair of second transmission gears 2563 directly face towards two middle shaft holes 2511 of each rotation assembly 250, and two opposite ends of each second rotation shaft 2564 are inserted into the corresponding shaft holes 2511. The paired first transmission gears 2561 engage with two driving gears 2570, respectively. The paired second transmission gears 2563 engage with each other, and also engage with the paired first transmission gears 2561, respectively. Then, the one pair of rotation assemblies 250 and the gear assembly 256 are placed in the shell 259. The two connecting blocks 2595 are respectively inserted into the connecting openings 2513 of the paired rotation assemblies 250. Each of a plurality of locking members is provided to pass through a through-hole 2514 of a corresponding support frame 251, and is locked in a corresponding connecting hole 2596, such that the one pair of rotation assemblies 250 is fixed in the shell 259, and an outer peripheral portion of each of the first transmission gear 2561 and the second transmission gear 2563 is accommodated in a corresponding avoidance groove 2597.

After the assembly, the support frame 251 and the rotating rack 253 of each rotation assembly 250 can rotate with respect to each other through a connection between the first arc-shaped groove 2552 and the first rotating rib 2518 that are mutually fitted to each other. The first arc-shaped groove 2552 is defined on the rotating rack 253. The first rotating rib 2518 is provided on the support frame 251, and the rotation shaft between the rotating rack 253 and the support frame 251 is a virtual shaft. The axis of the virtual shaft is located outside each rotation assembly 250. The axis of the virtual shaft coincides with the axis of the first arc-shaped groove 2552 and the axis of the second arc-shaped groove 2577.

In other embodiments, the first arc-shaped groove can also be defined on the support frame 251, and the first rotating rib can be provided on the rotating rack 253. In an embodiment, the first arc-shaped groove is defined on an inner wall of the accommodating space 2516 of the support frame 251, and the first rotating rib protrudes from the rotating block 255. The first rotating rib is slidably accommodated in the first arc-shaped groove, such that the rotating rack 253 and the support frame 251 are rotatably connected to each other.

In other embodiments, the second arc-shaped groove may also be defined on the support frame 251, and the second rotating rib may also be provided on the rotating rack 253. In an embodiment, the second arc-shaped groove is defined on an inner wall of the guide groove 2517 of the support frame 251, and the second rotating rib is provided by protruding from a side surface of the guide plate 2573. The second rotating rib is slidably accommodated in the second arc-shaped groove.

In other embodiments, the connecting piece 257 may be fixed to the rotating piece 255 through a snap connection, or an adhesive connection.

In other embodiments, the connecting piece 257 and the rotating piece 255 may be formed as one piece.

As illustrated in FIG. 3, the electronic device 100 further includes two planar plates 60 respectively attached to front surfaces of the first frame body 21 and the second frame body 23, and a support sheet 70 attached to the flexible screen 30. A first receiving groove 62 and the second receiving groove 64 are defined on the two cover plates 60, respectively. The first receiving groove 62 corresponds to the reinforcing plate on a front surface of the rotating rack 253. The second receiving groove 64 corresponds to the connecting plate 2571. The support sheet 70 is a flexible support sheet. The support sheet 70 may be a thin metal sheet such as a copper foil, a liquid metal sheet, a memory alloy sheet, a plastic sheet; or a sheet made of other suitable materials. In an embodiment, the support sheet 70 is a thin steel sheet.

Figure 7:
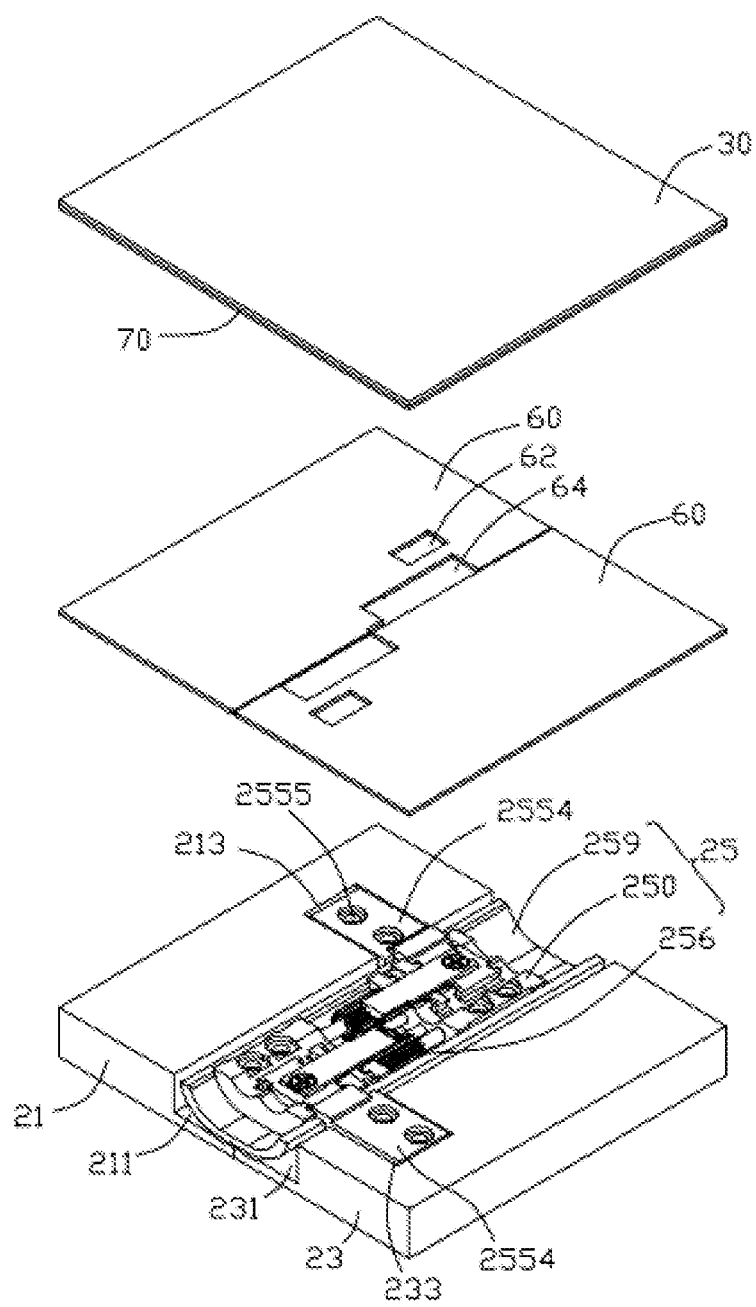
FIG. 7 is a schematic diagram of a partially assembled electronic device in FIG. 2.
Figure 8:
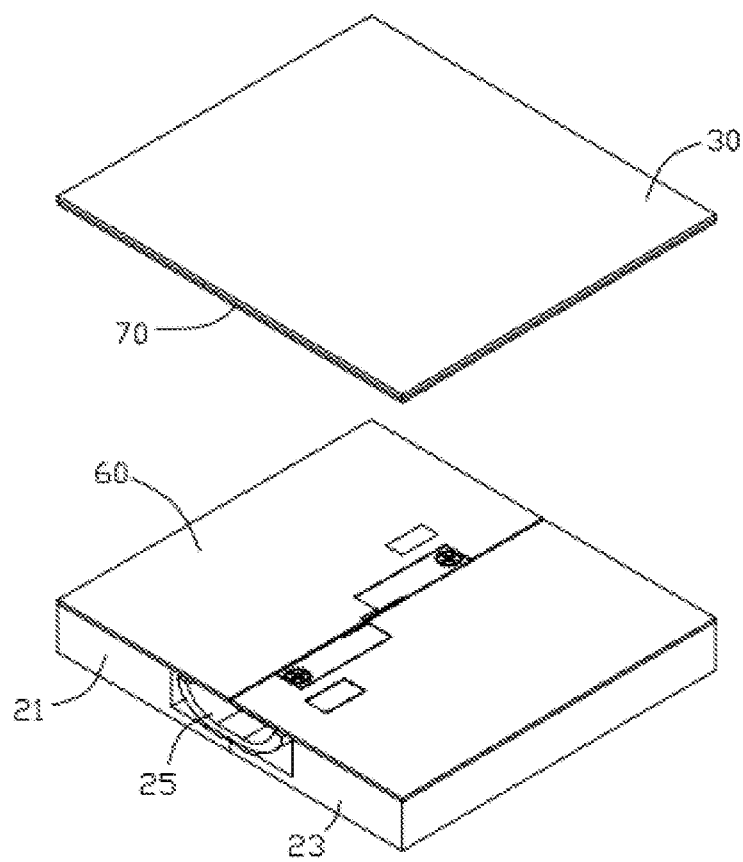
FIG. 8 is a schematic diagram of an electronic device in FIG. 7, which is further assembled.
Figure 9:
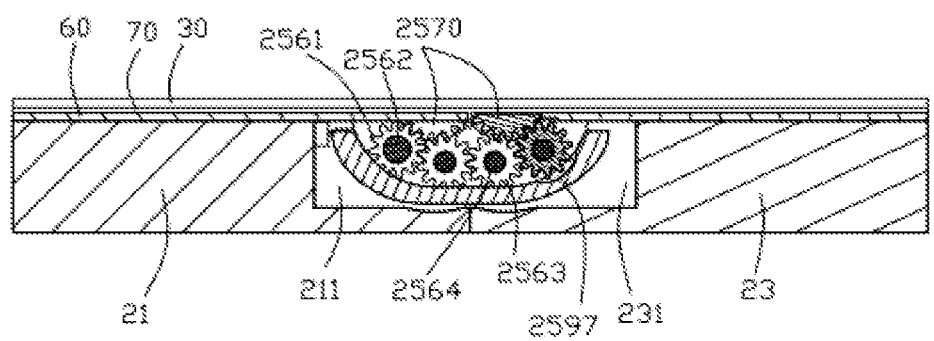
FIG. 9 is a cross-sectional view taken along line IX-IX in FIG. 1.

FIG. 7 is a schematic diagram of a partially assembled electronic device in FIG. 2. FIG. 8 is a schematic diagram of an electronic device in FIG. 7, which is further assembled. FIG. 9 is a cross-sectional view taken along line IX-IX in FIG. 1. Referring to FIG. 7 to FIG. 9, during the assembly of the electronic device 100, the first frame body 21 and the second frame body 23 are flush with each other in such a manner that the first accommodating groove 211 of the first frame body 21 and the second accommodating groove 231 of the second frame body 23 define a space, in which the rotating device 25 is placed to respectively accommodate the mounting plates 2554 of the one pair of rotation assemblies 250 into the first mounting groove 213 and the second mounting groove 233. A number of locking members each penetrates the mounting holes 2555 on the mounting plate 2554, and is locked in corresponding locking holes 214, 234. In this case, the first frame body 21 and the second frame body 23 are in an unfolded state, and each rotating piece 255 is positioned on a corresponding positioning rod 2512, i.e., the positioning rod 2512 is positioned in the positioning groove between the rotating block 2551 and the mounting plate 2554 on a rear surface of the rotating piece 255. The two planar plates 60 are attached to the front surfaces of the first frame body 21 and the front surface of the second frame body 23, respectively. The reinforcing plate and the connecting plate 2571 of each rotation assembly 250 are accommodated in the first accommodating groove 62 and the second accommodating groove 64, respectively. A head of the locking member on the electronic device 100 is accommodated in a corresponding countersunk hole, allowing the front surfaces of the two planar plates 60 to be on a same plane, which is conducive to reducing an overall thickness of the electronic device 100. A front surface of the support sheet 70 is attached to the rear surface of the flexible screen 30, and the rear surface of the support sheet 70 is attached to the front surfaces of the two planar plates 60. In this way, the assembly of the electronic device 100 is completed.

Figure 10:
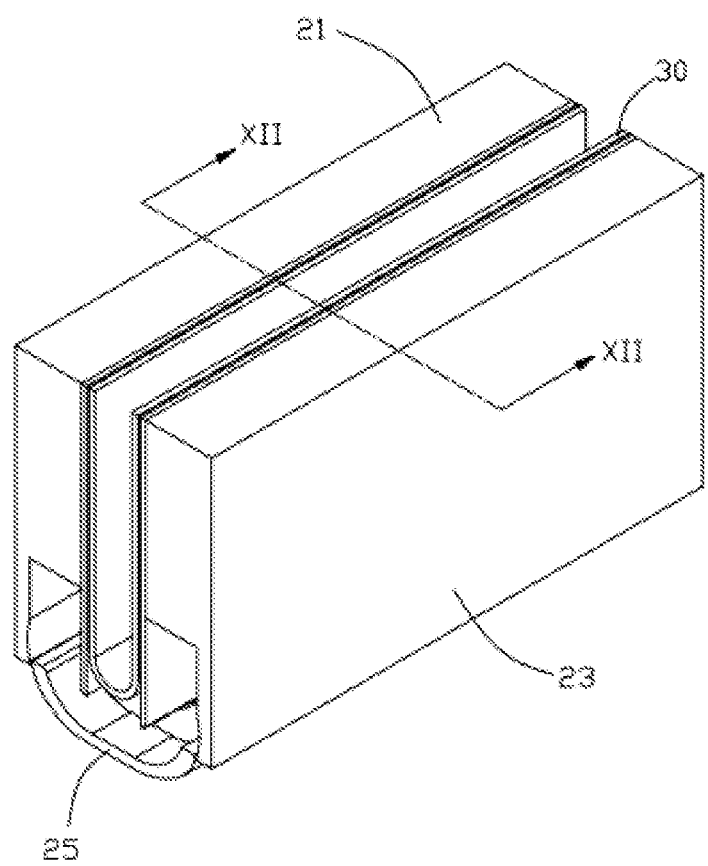
FIG. 10 is a schematic diagram illustrating a folded state of an electronic device in FIG. 1.
Figure 11:
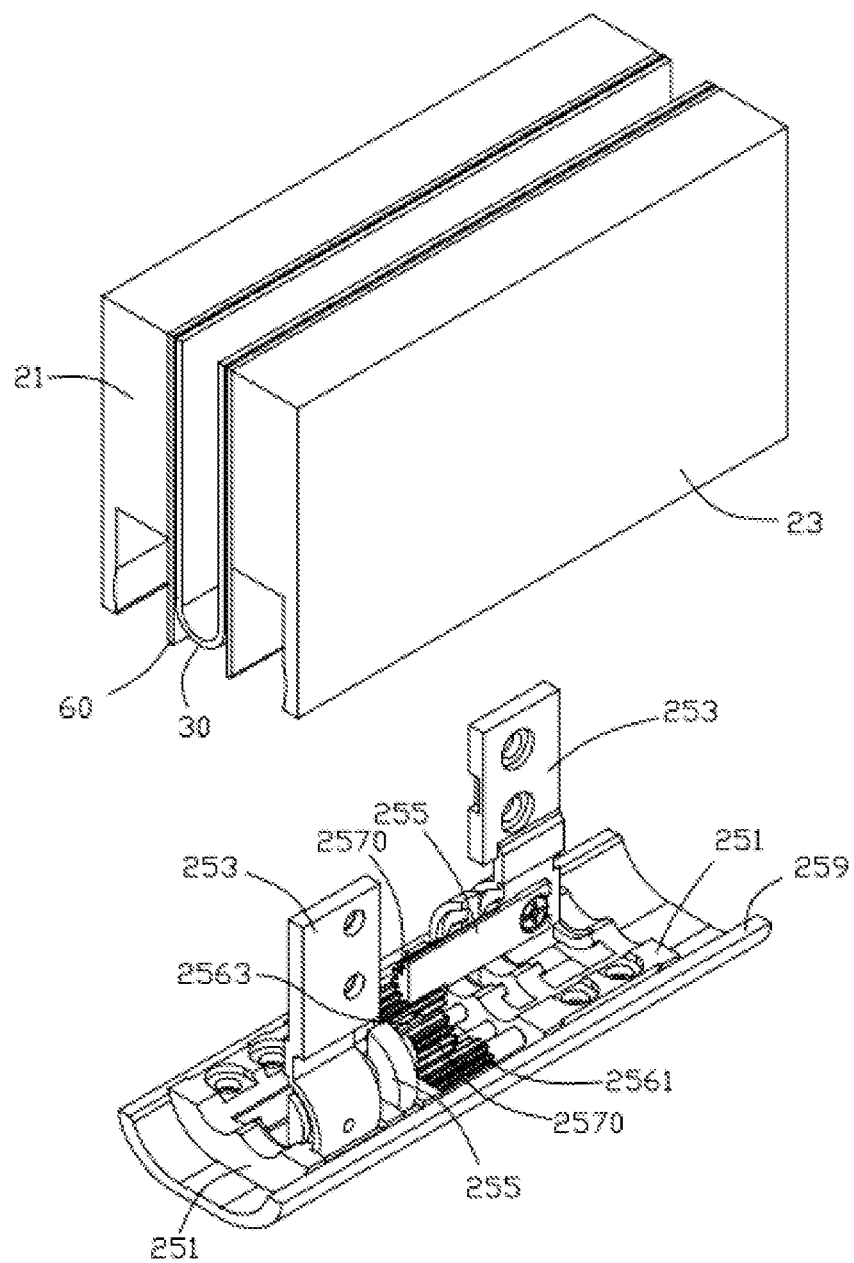
FIG. 11 is an exploded view illustrating a folded state of an electronic device in FIG. 10.
Figure 12:
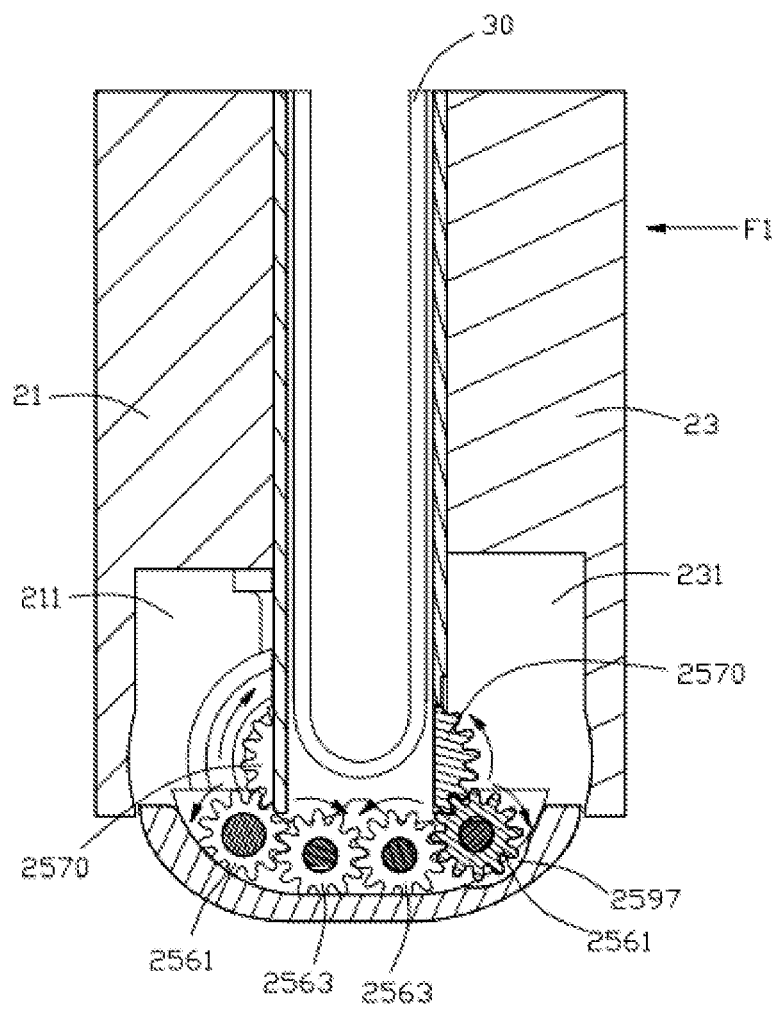
FIG. 12 is a cross-sectional view taken along line XII-XII in FIG. 10.

FIG. 10 is a schematic diagram illustrating a folded state of an electronic device in FIG. 1. FIG. 11 is an exploded view of an electronic device in FIG. 10. FIG. 12 is a cross-sectional view taken along line XII-XII in FIG. 10. Referring to FIG. 10 to FIG. 12, when the electronic device 100 needs to be folded, a folding force F1 is applied to at least one of the first frame body 21 and the second frame body 23 of the electronic device 100, for example, a folding force F1 applied to the second frame body 23 as illustrated in FIG. 12, allowing the rotating pieces 255 connected to the first frame body 21 and the second frame body 23 to rotate to approach to each other. In an embodiment, the rotating piece 255 fixed on the second frame body 23 rotates counterclockwise towards the first frame body 21, so as to drive the driving gear 2570 of the rotating piece 255 to rotate counterclockwise; the driving gear 2570 drives a corresponding first transmission gear 2561 to rotate clockwise; the first transmission gear 2561 drives a corresponding second transmission gear 2563 to rotate counterclockwise; the corresponding second transmission gear 2563 drives another second transmission gear 2563 to rotate clockwise; this second transmission gear 2563 drives another corresponding first transmission gear 2561 to rotate counterclockwise; and this first transmission gear 2561 drives another corresponding driving gear 2570 to rotate clockwise. That is, the first frame body 21 and the second frame body 23 can approach to each other through a linkage of the rotating devices 25, thereby achieving the folding.

During the folding of the electronic device 100, a folding force can also be applied to the first frame body 21, allowing the rotating piece 255 fixed to the first frame body 21 to rotate clockwise towards the second frame body 23, thereby driving a corresponding driving gear 2570 to rotate clockwise. Then, this corresponding driving gear 2570 drives a corresponding first transmission gear 2561 to rotate counterclockwise. The first transmission gear 2561 drives a corresponding second transmission gear 2563 to rotate clockwise. This corresponding second transmission gear 2563 drives another second transmission gear 2563 to rotate counterclockwise. This second transmission gear 2563 drives another corresponding first transmission gear 2561 to rotate clockwise. This first transmission gear 2561 drives a corresponding another driving gear 2570 to rotate counterclockwise. That is, the first frame body 21 and the second frame body 23 can approach to each other through a linkage of the rotating devices 25, thereby achieving the folding.

During the folding of the electronic device 100, a folding force can also be applied to both the first frame body 21 and the second frame body 23, in order to rotate the rotating piece 255 connected to the first frame body 21 and the second frame body 23 to approach to each other.

Figure 13:
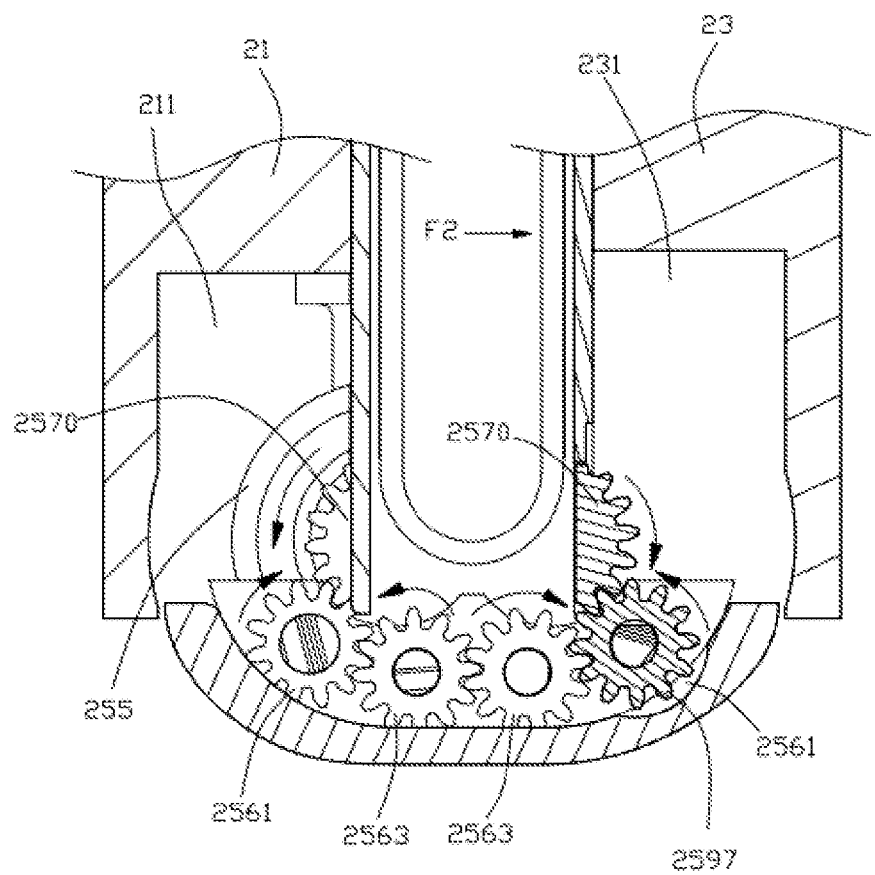
FIG. 13 is a schematic diagram illustrating of an electronic device to be unfolded according to an embodiment of the present disclosure.

FIG. 13 is a schematic diagram illustrating an unfolding process of an electronic device according to an embodiment of the present disclosure. Referring to FIG. 13, when the electronic device 100 needs to be unfolded, an unfolding force F2 is applied to at least one of the first frame body 21 and the second frame body 23 of the electronic device 100, for example, an unfolding force F2 applied to the second frame body 23 as illustrated in FIG. 13, so as to rotate the rotating pieces 255 connected to the first frame body 21 and the second frame body 23 in a direction facing away from each other. In an embodiment, the rotating piece 255 fixed to the second frame body 23 rotates clockwise in a direction facing away from the first frame body 21, thereby driving the driving gear 2570 of the rotating piece 255 to rotate clockwise; this driving gear 2570 drives a corresponding first transmission gear 2561 to rotate counterclockwise; this corresponding first transmission gear 2561 drives a corresponding second transmission gear 2563 to rotate clockwise; this corresponding second transmission gear 2563 drives another second transmission gear 2563 to rotate counterclockwise; this second transmission gear 2563 drives another corresponding first transmission gear 2561 to rotate clockwise; and this first transmission gear 2561 drives a corresponding another driving gear 2570 to rotate counterclockwise. That is, the first frame body 21 and the second frame body 23 are moved away from each other through the linkage of the rotating devices 25, thereby achieving the unfolding.

During the unfolding of the electronic device 100, the unfolding force can also be applied to the first frame body 21 to rotate the rotating piece 255 fixed to the first frame body 21 counterclockwise in a direction facing away from the second frame body 23, thereby allowing the driving gear 2570 fixed to the rotating piece 255 to rotate counterclockwise. The driving gear 2570 drives a corresponding first transmission gear 2561 to rotate clockwise. The corresponding first transmission gear 2561 drives a corresponding second transmission gear 2563 to rotate counterclockwise. This corresponding second transmission gear 2563 drives another second transmission gear 2563 to rotate clockwise. This second transmission gear 2563 drives another corresponding first transmission gear 2561 to rotate counterclockwise. This first transmission gear 2561 drives another corresponding driving gear 2570 to rotate clockwise. That is, the first frame body 21 and the second frame body 23 are moved away from each other through the linkage of the rotating devices 25, thereby achieving the unfolding.

During the unfolding of the electronic device 100, the unfolding force can also be applied to both of the first frame body 21 and the second frame body 23, such that the rotating piece 255 connected to the first frame body 21 and the second frame body 23 can rotate away from each other.

Due to a frictional damping force present between gears in the gear assembly 256, the rotating device 25 can be positioned in any one of possible folding states between an unfolding state and a fully folded state in absence of an external force.

The present disclosure adopts engagement and linkage of spur gears, which does not require extremely high manufacturing accuracy and can reduce the cost effectively and improve the production efficiency, when compared with the situation using engagement and linkage of helical gears.

Figure 14:
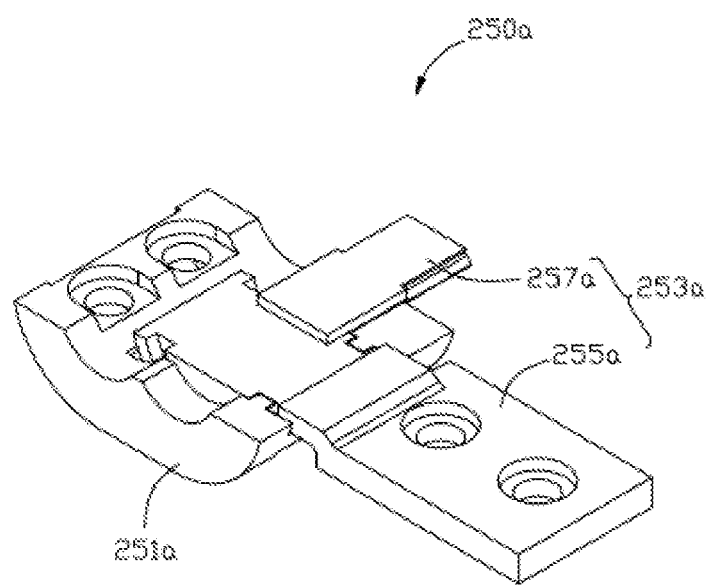
FIG. 14 is a schematic perspective view of a rotation assembly of an electronic device according to an embodiment of the present disclosure.
Figure 15:
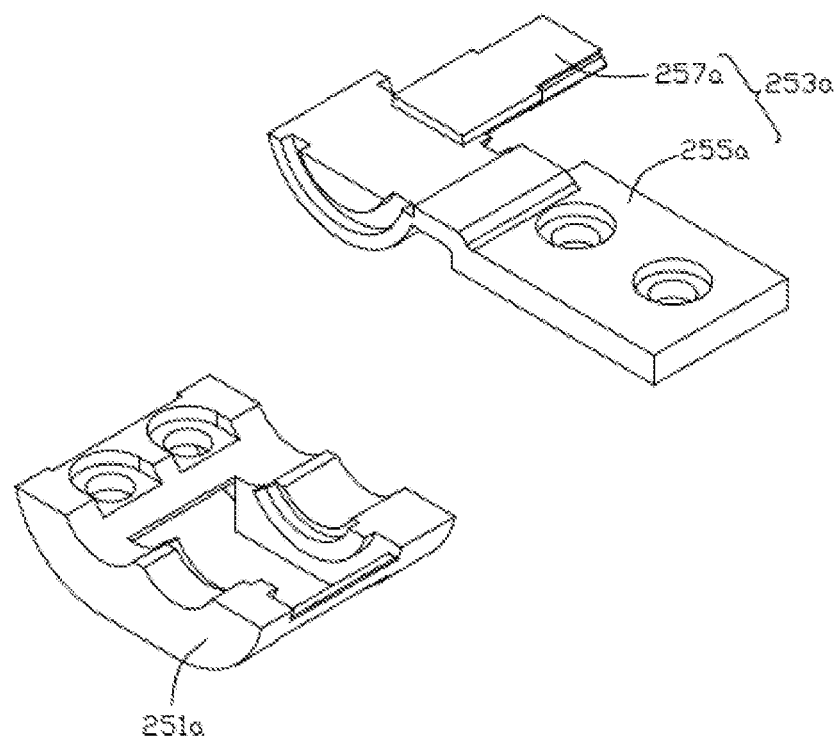
FIG. 15 is an exploded view of a rotation assembly in FIG. 14.

FIG. 14 is a schematic perspective view of a rotation assembly of an electronic device according to another embodiment of the present disclosure. FIG. 15 is an exploded view of a rotation assembly in FIG. 14. Referring to FIG. 14 and FIG. 15, a structure of the electronic device according to another embodiment of the present disclosure is similar to that illustrated in FIG. 5, except that a rotation assembly 250a illustrated in FIG. 14 and FIG. 15 is structurally different from the rotation assembly 250 illustrated in FIG. 5. In an embodiment, a rotation assembly 250a includes a support frame 251a and a rotating rack 253a. In the support frame 251a, the guide groove 2517 and the second rotating rib 2519 included in the support frame 251 as illustrated in FIG. 5 are omitted. The rotating rack 253a includes a rotating piece 255a and a connecting piece 257a. The rotating piece 255a and the connecting piece 257a are formed as one piece.

As illustrated in FIG. 14 and FIG. 15, the structures of the support frame 251a and the rotating rack 253a of the electronic device are simpler, thereby reducing cost of production.

The above are implementations of the embodiments of the present disclosure. It should be understood that, those skilled in the art can make several changes and modifications without departing from principles of the embodiments of the present disclosure. These changes and modifications shall also be regarded as falling into the protection scope of the present disclosure.

What is claimed is:

1. A rotating device, comprising:
at least one pair of rotation assemblies; and
a gear assembly located between rotation assemblies of one pair of the at least one pair of rotation assemblies,
wherein each rotation assembly of the at least one pair of rotation assemblies comprises a support frame and a rotating rack rotatably connected to the support frame, the rotating rack is provided with a driving gear engaging with the gear assembly,
wherein the rotating racks of one pair of rotation assemblies are synchronously rotatable by rotating the rotating rack relative to a corresponding support frame; driving, by the rotation of the rotating rack, a corresponding driving gear to rotate; and further rotating, by the rotation of the corresponding driving gear, the gear assembly,
wherein, in each rotation assembly of the at least one pair of rotation assemblies, a rotation shaft between the support frame and the rotating rack is a virtual shaft, and an axis of the virtual shaft is located outside the rotation assembly, and
wherein, in each rotation assembly of the at least one pair of rotation assemblies, the support frame and the rotating rack are connected to each other through a first arc-shaped groove and a first rotating rib that are mutually matched with each other, and an axis of the first arc-shaped groove coincides with the axis of the virtual shaft of the rotation assembly.

2. The rotating device according to claim 1, wherein the first rotating rib is slidably accommodated in the first arc-shaped groove; and the first arc-shaped groove is defined in the support frame, and the first rotating rib is provided on the rotating rack; or the first arc-shaped groove is defined in the rotating rack, and the first rotating rib is provided on the support frame.

3. The rotating device according to claim 2, wherein an accommodating space is defined in the support frame, the rotating rack comprises a rotating block protruding from the rotating rack and rotatably accommodated in the accommodating space; and the rotating block and the support frame are slidably connected to each other through the first arc-shaped groove and the first rotating rib.

4. The rotating device according to claim 3, wherein the first arc-shaped groove is defined in the rotating block, the first rotating rib is provided on the support frame by protruding from an inner wall of the accommodating space; or the first arc-shaped groove is defined in the inner wall of the accommodating space of the support frame, and the first rotating rib is provided on the rotating block by protruding therefrom.

5. The rotating device according to claim 4, wherein the rotating rack comprises a rotating piece and a connecting piece, the rotating block is arranged at one end of the rotating piece, the driving gear is arranged at one end of the connecting piece, and an end of the connecting piece facing away from the driving gear is fixed to the end of the rotating piece where the rotating block is arranged.

6. The rotating device according to claim 5, wherein the connecting piece is fixed to the rotating piece through a screw connection, a snap connection, or an adhesive connection.

7. The rotating device according to claim 5, wherein the connecting piece and the rotating piece are formed as one piece.

8. The rotating device according to claim 5, wherein a guide groove is defined in the support frame, the connecting piece is provided with a guide plate protruding from the connecting piece and rotatably accommodated in the accommodating groove, the guide plate and the support frame are slidably connected to each other through a second arc-shaped groove and a second rotating rib, and an axis of the second arc-shaped groove coincides with the axis of the virtual shaft a corresponding rotation assembly.

9. The rotating device according to claim 8, wherein the second arc-shaped groove is defined in the guide plate, and the second rotating rib protrudes from a side surface of the guide groove of the support frame; or the second arc-shaped groove is defined in the side surface of the guide groove of the support frame, and the second rotating rib protrudes from the guide plate.

10. The rotating device according to claim 1, wherein the gear assembly comprises one pair of first transmission gears engaging with the driving gears of the rotating racks of one pair of rotation assemblies, and one pair of second transmission gears located between the one pair of first transmission gears;

second transmission gears of the one pair of second transmission gears engage with each other, and engage with first transmission gears of the one pair of first transmission gears, respectively.

11. The rotating device according to claim 10, wherein each first transmission gear of the one pair of first transmission gears is sleeved on a first rotation shaft, each second transmission gear of the one pair of second transmission gears is sleeved on a second rotation shaft, the first rotation shaft is parallel to the second rotation shaft, and the first rotation shaft and the second rotation shaft are connected between the at least one pair of rotation assemblies.

12. The rotating device according to claim 1, further comprising a housing, wherein the support frames of the at least one pair of rotation assemblies are fixed in the housing.

13. A housing, comprising:
a first frame body;
a second frame body; and
a rotating device, the rotating device comprising at least one pair of rotation assemblies and a gear assembly located between rotation assemblies of one pair of the at least one pair of rotation assemblies, wherein each rotation assembly of the at least one pair of rotation assemblies comprises a support frame and a rotating rack rotatably connected to the support frame, the rotating rack is provided with a driving gear engaging with the gear assembly, wherein the rotating racks of one pair of rotation assemblies are synchronously rotatable by rotating the rotating rack relative to a corresponding support frame; driving, by the rotation of the rotating rack, a corresponding driving gear to rotate; and further rotating, by the rotation of the corresponding driving gear, the gear assembly, wherein, in each rotation assembly of the at least one pair of rotation assemblies, a rotation shaft between the support frame and the rotating rack is a virtual shaft, and an axis of the virtual shaft is located outside the rotation assembly, wherein, in each rotation assembly of the at least one pair of rotation assemblies, the support frame and the rotating rack are connected to each other through a first arc-shaped groove and a first rotating rib that are mutually matched with each other, and an axis of the first arc-shaped groove coincides with the axis of the virtual shaft of the rotation assembly, and wherein the rotating device is connected between the first frame body and the second frame body, and the rotating device is configured to fold or unfold the first frame body and the second frame body.

14. The housing according to claim 13, wherein a first accommodating groove is defined on a side adjacent to the second frame body of the first frame body, a second accommodating groove is defined on a side adjacent to the first frame body of the second frame body, and the rotating device is accommodated in a space defined by the first accommodating groove and the second accommodating groove.

15. The housing according to claim 14, wherein a first mounting groove is defined in the first frame body, a second mounting groove is defined in the second frame body, the rotating racks of one pair of rotation assemblies of the rotating device are connected into the first mounting groove of the first frame body and the second mounting groove of the second frame body, respectively.

16. An electronic device, comprising:
a flexible screen; and
a housing, wherein the flexible screen is arranged on the housing, the housing comprises a first frame body, a second frame body, and a rotating device, the rotating device comprising:

at least one pair of rotation assemblies; and a gear assembly located between rotation assemblies of one pair of the at least one pair of rotation assemblies, wherein each rotation assembly of the at least one pair of rotation assemblies comprises a support frame and a rotating rack rotatably connected to the support frame, the rotating rack is provided with a driving gear engaging with the gear assembly, wherein the rotating racks of one pair of rotation assemblies are synchronously rotatable by rotating the rotating rack relative to a corresponding support frame; driving, by the rotation of the rotating rack, a corresponding driving gear to rotate; and further rotating, by the rotation of the corresponding driving gear, the gear assembly, wherein, in each rotation assembly of the at least one pair of rotation assemblies, a rotation shaft between the support frame and the rotating rack is a virtual shaft, and an axis of the virtual shaft is located outside the rotation assembly, wherein, in each rotation assembly of the at least one pair of rotation assemblies, the support frame and the rotating rack are connected to each other through a first arc-shaped groove and a first rotating rib that are mutually matched with each other, and an axis of the first arc-shaped groove coincides with the axis of the virtual shaft of the rotation assembly, and wherein the rotating device is connected between the first frame body and the second frame body, and the rotating device is configured to fold or unfold the first frame body and the second frame body.

17. The electronic device according to claim 16, wherein an axis of a virtual shaft of each rotation assembly of the at least one pair of rotation assemblies of the rotating device is located on a neutral layer of the flexible screen.

18. The electronic device according to claim 16, wherein a first flat plate is provided between the first frame body and the flexible screen, and a second flat plate is provided between the second frame body and the flexible screen;

a support sheet is attached to a side surface of the flexible screen facing towards the housing, and the support sheet is attached to the first flat plate and the second plate.

* * * * *